(12) United States Patent
Patel et al.

(10) Patent No.: US 7,399,341 B2
(45) Date of Patent: Jul. 15, 2008

(54) GAS PURIFICATION PROCESS

(75) Inventors: Kirit M. Patel, Winfield, IL (US);
Henry Rastelli, Gurnee, IL (US);
Martha S. Buchan, Lincolnshire, IL
(US); Henry L. Griffith, Mobile, AL
(US); Michele S. Herron, Spanish Fort,
AL (US)

(73) Assignee: UOP LLC, Des Plaines, IL (US)

( * ) Notice: Subject to any disclaimer, the term of this
patent is extended or adjusted under 35
U.S.C. 154(b) by 641 days.

(21) Appl. No.: 11/114,285

(22) Filed: Apr. 26, 2005

(65) Prior Publication Data

US 2006/0236861 A1  Oct. 26, 2006

(51) Int. Cl.
*B01D 53/047* (2006.01)

(52) U.S. Cl. .............................. 95/96; 95/103; 95/140; 423/709

(58) Field of Classification Search .................. 95/95, 95/96, 103, 130, 139, 140, 143; 96/132; 423/248, 648.1, 709, DIG. 31; 502/64, 439
See application file for complete search history.

(56) References Cited

U.S. PATENT DOCUMENTS

| 2,882,244 A | 4/1959 | Milton ............... 252/455 |
| 3,078,639 A | 2/1963 | Milton ............... 55/68 |
| 3,430,418 A | 3/1969 | Wagner ............... 55/25 |
| 4,194,891 A * | 3/1980 | Earls et al. ............... 95/98 |
| 4,381,189 A | 4/1983 | Fuderer ............... 55/26 |
| 4,477,267 A | 10/1984 | Reiss ............... 55/68 |
| 6,180,549 B1 * | 1/2001 | Mazany et al. ............... 502/64 |
| 6,514,317 B2 | 2/2003 | Hirano et al. ............... 95/96 |
| 6,656,447 B1 * | 12/2003 | Tannous et al. ............... 423/709 |
| 6,773,693 B2 * | 8/2004 | Hosokawa et al. ............... 423/702 |
| 6,773,694 B1 | 8/2004 | Lesch et al. ............... 423/709 |
| 7,052,533 B2 * | 5/2006 | Nakahara et al. ............... 96/154 |
| 2007/0135637 A1 * | 6/2007 | Bosch et al. ............... 544/352 |

* cited by examiner

*Primary Examiner*—Frank M. Lawrence
(74) *Attorney, Agent, or Firm*—Mark Goldberg

(57) ABSTRACT

A process for the purification of hydrogen based gas mixtures utilizing zeolite X wherein the particle size distribution of the zeolite X powder has a coefficient of variation from about 15% to about 30%.

24 Claims, 3 Drawing Sheets

GAS PURIFICATION PROCESS

FIELD OF THE INVENTION

The invention relates to a process for the purification of hydrogen based gas mixtures contaminated by various impurities, including carbon monoxide and at least one other impurity chosen from carbon dioxide, nitrogen and $C_1$-$C_8$ hydrocarbons.

The process of the invention enables the improvement of conventional processes for the separation and purification of hydrogen using pressure swing adsorption (PSA) processes utilizing a zeolite possessing characteristics which demonstrate unexpected results.

BACKGROUND OF THE INVENTION

The production of high-purity hydrogen is of great interest industrially, the latter being widely used in many processes, such as hydrocracking, the production of methanol, the production of oxoalcohols and in isomerization processes.

In the prior art, PSA processes have proved to be very efficient in the separation of gas mixtures and in particular in the production of pure hydrogen or oxygen from gas mixtures contaminated by various impurities. PSA processes take advantage of the adsorption selectivity of a given adsorbent for one or a number of the contaminating substances of the gas mixture to be purified.

The choice of the adsorbent is problematic because it depends on the nature of the mixture to be treated. As a general rule, the adsorbents are selected according to their ability to adsorb and to desorb a specific compound. In fact, PSA processes involve the operation of pressure cycles. In a first phase, the adsorbent bed separates at least one constituent of the mixture by adsorption of this constituent on the adsorbent bed. In a second phase, the adsorbent is regenerated by lowering the pressure. At each new cycle, it is therefore essential for the desorption to be efficient and complete, so that there is an identical regenerated state at each new cycle. However, it is clear that this ability to adsorb and then desorb a specific constituent of a gas mixture is a function of the specific operating conditions of the PSA process envisaged and in particular of the temperature and pressure conditions.

However, insofar as the mixture to be purified generally comprises more than one impurity, it is desirable for the adsorbent to be able to adsorb and then desorb not one alone but a number of these impurities. In point of fact, the adsorption profile and selectivity for a given constituent are often influenced by the presence, in the gas mixture, of other impurities, this being due, for example, to possible competition or to poisoning of the adsorbent. These various considerations account for the complexity of the problem of the optimization of PSA processes by improvement of the adsorbent.

INFORMATION DISCLOSURE

In regard to the production of hydrogen from a hydrogen based gas mixture containing CO, $CO_2$, $CH_4$, $NH_3$, $H_2S$, $N_2$ and water as impurities, U.S. Pat. No. 3,430,418 provides the combination of two types of adsorbent, the first, which is an active charcoal, removing $CH_4$, $CO_2$ and water and the second, which is a zeolite of type A containing calcium, making possible the removal of the nitrogen and the carbon monoxide.

The improvement of performance characteristics of PSA processes for the production of hydrogen, and in particular with a view to obtaining a better hydrogen yield, the number and the arrangement of the adsorbent beds operating in parallel have been varied as illustrated in U.S. Pat. No. 4,381,189.

U.S. Pat. No. 2,882,244 (Milton) discloses zeolite X and teaches that CO is selectively adsorbed thereon.

U.S. Pat. No. 3,078,639 (Milton) discloses a process for removing $CO_2$ from a hydrogen rich gaseous mixture using zeolite X.

U.S. Pat. No. 6,514,317 (Hirano et al.) discloses a PSA process using an X zeolite having a silica/alumina ratio of 1.9-2.1 including ion-exchange with Li, Na, K, Mg, Ca and Zn.

U.S. Pat. No. 4,477,267 (Reiss) discloses a PSA process using zeolite X with a silica/alumina ratio of 2-3.

U.S. Pat. No. 6,773,694 B1 (Lesch et al.) discloses a process for synthesizing a variety of molecular sieves wherein a slurry of seed crystals is grown by the addition of nutrients or sources of the framework, e.g., aluminum and silicon. The rate of addition of the nutrients is controlled such that it is substantially the same as the crystal growth rate and such that there is substantially no nucleation of new crystals.

SUMMARY OF THE INVENTION

The present invention is based on the discovery that the use of an X zeolite adsorbent having a particular particle size distribution in a process for the separation and purification of hydrogen and particularly in a PSA process results in an unexpected and significant increase in productivity and recovery of hydrogen. The term productivity denotes the ratio of the volume of hydrogen produced per hour and per volume or weight of adsorbent. The term recovery denotes the ratio of the hydrogen produced and the hydrogen in the feed gas.

More specifically, the invention relates to a process for the separation and purification of hydrogen contained in a gas mixture contaminated by impurities which comprises contacting the gas mixture to be purified in an adsorption region containing an adsorbent comprising a zeolite X wherein the particle size distribution of the zeolite X powder has a coefficient of variation from about 15% to about 30%.

Another embodiment of the invention is a process for the separation of hydrogen contained in a gas mixture contaminated by impurities which comprises contacting the gas mixture to be purified in an adsorption region containing an adsorbent comprising a zeolite X synthesized by providing a slurry of seed crystals at reaction conditions; adding to the slurry nutrients, to provide framework elements of the seed crystals thereby growing the seed crystals; performing the addition at a rate that essentially equals the crystal growth rate and for a time sufficient to produce the zeolite X sieve.

Another embodiment of the invention is a process for conducting the contacting of the gas mixture in a series of adsorption regions in accordance with a pressure swing adsorption (PSA) system.

These and other objects, embodiments and details of this invention will become apparent from the detailed description of the invention.

DETAILED DESCRIPTION OF THE INVENTION

Figure 1:
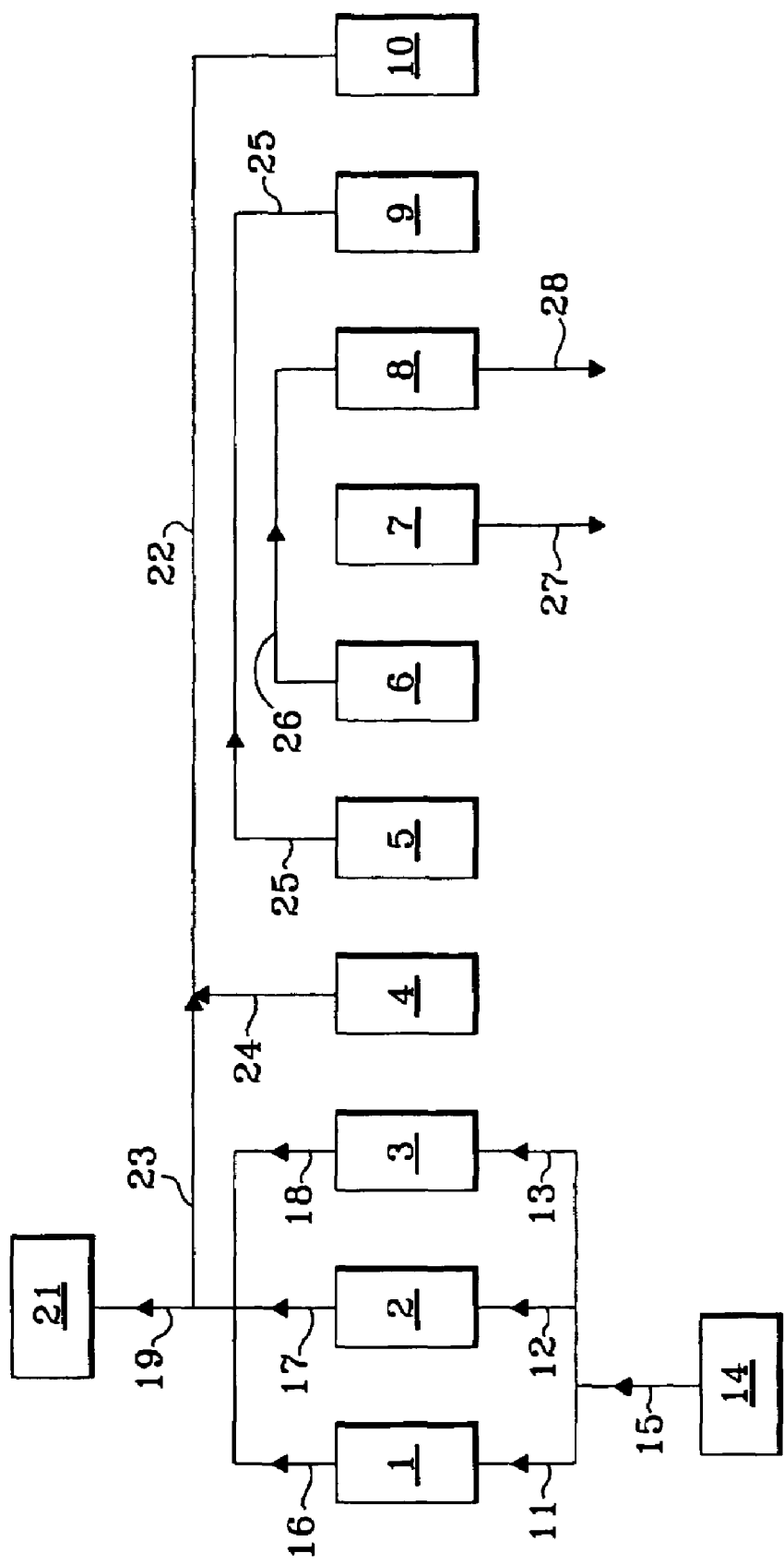
FIG. 1 diagrammatically represents a plant for the operation of a pressure swing adsorption (PSA) process for the purification and production of hydrogen utilizing ten adsorbent beds.

In accordance with one embodiment of the present invention, the separation of the hydrogen contained in a gaseous mixture contaminated by carbon monoxide and containing at least one other impurity chosen from the group consisting of carbon dioxide and $C_1$-$C_8$ hydrocarbons comprises contacting the gas mixture with at least one first adsorbent selective for the removal of carbon dioxide and $C_1$-$C_8$ hydrocarbons and a second adsorbent comprising zeolite X wherein the particle size distribution of the zeolite X has a coefficient of variation from about 15% to about 30% for carbon monoxide and nitrogen removal.

According to a preferred embodiment, the gas mixture contains carbon monoxide, carbon dioxide, methane, nitrogen and hydrogen. A source for such a gas mixture is a methane steam reforming unit. Other gas mixtures which are suitable gas mixtures originate from coke oven units, methanol plants, olefin plants and ammonia plants.

Preferred operating conditions in an adsorption region include a pressure from about 790 kPa (100 psig) to about 7000 kPa (1000 psig) and a temperature from about 0° C. (32° F.) to about 80° C. (176° F.). Higher pressures do not adversely affect the purification but are generally avoided to save energy and to minimize plant investment costs.

The first and second adsorbents are arranged in the adsorption region so that the gas mixture passes through them one after the other. It has been found that the efficiency of the separation could be optimized by placing, at the inlet of the adsorption region, the adsorbent selective at least for carbon dioxide and for $C_1$-$C_8$ hydrocarbons and, at the outlet end of the adsorption region, the adsorbent made from zeolite X having a particle size distribution with a coefficient of variation from about 15% to about 30%. This result can be explained by the fact that the efficiency of the adsorption of the zeolite X adsorbent is increased once the impurities of $C_1$-$C_8$ hydrocarbon and carbon dioxide have been removed by the first adsorbent.

Use may be made, as adsorbent selective at least for carbon dioxide and for $C_1$-$C_8$ hydrocarbons, of an active charcoal, a prefilter charcoal, a silica gel or a mixture of these various adsorbents in any proportion. When such a mixture is chosen, it is preferable to arrange the various constituents of the mixture, in the adsorption region, in the form of separate layers so that the gas mixture comes into contact with each layer in turn.

The silica gels which can be used according to the invention are those commonly used in the art. These gels are commercially available, in particular from Solvay (Sorbead gel). The prefilter charcoals are active charcoals of high porosity and low relative density. The active charcoals and prefilter charcoals are, for example, sold by Norit, Calgon, Ceca, Pica or Chemviron.

The use of zeolite X has long been known and utilized for the separation and purification of hydrogen contained in a gas mixture. However, until recently the traditional method of producing zeolite X powder has been by batch crystallization of admixed starting materials. Another method to produce zeolite X powder has recently been found and is described in U.S. Pat. No. 6,773,694 B1. The '694 patent discloses a process for synthesizing zeolite X wherein a slurry of seed crystals is grown by the addition of nutrients or sources of the framework, e.g., aluminum and silicon. The rate of addition of the nutrients is controlled such that it is substantially the same as the crystal growth rate and such that there is substantially no nucleation of new crystals. The '694 patent teaches further details and methods of preparing zeolite X, and is incorporated herein by reference.

The zeolite X powder having a particle size distribution with a coefficient of variation from about 15% to about 30% and produced in accordance with the '694 patent has unexpectedly been discovered to produce superior results for the separation and purification of hydrogen contained in a gas mixture. The as synthesized X zeolite powder preferably has a mean diameter in the range from about 4 to about 12 microns and more preferably in the range from about 6 to 10 microns. The zeolite X powder preferably have a silica/alumina ratio from 2.0 to 2.5. According to the invention, the zeolite X can be in the form of crystalline powder or of agglomerates. Zeolite X agglomerates are obtained conventionally by making use of standard agglomeration processes. The agglomerated zeolite can, for example, be prepared by mixing a crystalline zeolite powder with water and a binder (generally in the powder form) and then spraying this mixture onto zeolite agglomerates acting as agglomeration seed. During the spraying, the zeolite agglomerates are continuously rotated about themselves. This can be achieved by placing the agglomerates in a reactor rotating about itself around a rotational axis, the rotational axis preferably being inclined with respect to the vertical direction. By this process, commonly denoted in the art by "snowball" process, agglomerates in the form of balls are obtained. The agglomerates thus obtained are then subjected to firing at a temperature of between approximately 500° and 700° C., preferably at a temperature in the region of 600° C. Suitable binders include, for example, a clay, such as kaolin, silica or alumina. A zeolite crystal powder typically has no self-binding property and hence a binder is preferably incorporated therewith to be shaped into beads, pellets, extrudates or other forms for industrial use as an adsorbent. The zeolite X powder is preferably formed into agglomerated particles having a nominal diameter from about 0.5 to about 3 mm. Regardless of the method of preparation, the agglomerated particles used in the present invention may be incorporated with a binder or may be binderless. The resulting adsorbent containing zeolite X preferably has a bulk crush strength greater than about 960 kPa (125 psig).

According to the invention, the zeolite X powder having a particle size distribution with a coefficient of variation from about 15% to about 30% is preferably prepared in the sodium form, that is, the cations which are associated with the zeolitic framework are sodium. Other cations may be partially or completely ion exchanged with the sodium form zeolite X to displace the sodium cations. Such cations may be lithium, barium and calcium, for example.

The combination of the first and second adsorbents described hereinabove results in an improvement in the purification of the gas mixture containing hydrogen and in the overall productivity when the second adsorbent is a zeolite X having a particle size distribution with a coefficient of variation from about 15% to about 30%. It is known, so as to produce hydrogen continuously, to arrange in parallel a multiplicity of adsorbent beds, which are alternately subjected to a cycle of adsorption with adiabatic compression and of desorption with decompression. Such plants are employed in particular in PSA pressure swing adsorption processes. The treatment cycle to which each adsorbent bed is subjected comprises: a) passing a hydrogen-based gas mixture contaminated by carbon monoxide and containing at least one other impurity chosen from the group consisting of carbon dioxide and $C_1$-$C_8$ hydrocarbons into an adsorption region comprising at least one first adsorbent bed composed of a first adsorbent selective at least for carbon dioxide, nitrogen and for $C_1$-$C_8$ hydrocarbons and one second adsorbent bed composed of a second adsorbent which contains zeolite X having a particle size distribution with a coefficient of variation from about 15% to about 30% in order to remove at least carbon monoxide to obtain a purified hydrogen stream at an outlet of the adsorption zone; b) desorbing the carbon monoxide and the other impurity or impurities adsorbed on the first and second adsorbents by establishing a pressure gradient and progressively lowering the pressure in the adsorption region, so as to recover the carbon monoxide and the other impurity or impurities via the inlet of the adsorption region; and c) raising the pressure in the adsorption region by introduction of a stream of pure hydrogen via the outlet of the adsorption region. Thus, each adsorbent bed is subjected to a treatment cycle comprising a first phase of production of hydrogen, a second phase of decompression and a third phase of recompression.

It is clear that, by adjusting the operating conditions of stage a) in accordance with the preferred embodiments described above, the result is an improvement in the yield and productivity as well as an improvement in the purity of the hydrogen recovered at the outlet. Thus, the purification of a gas mixture containing more than 70% of hydrogen and comprising nitrogen, methane, CO and $CO_2$ as impurities will preferably be opted for, which mixture will be brought into contact with an adsorbent bed composed of active charcoal and of an adsorbent made from zeolite X having a particle size distribution with a coefficient of variation from about 15% to about 30%. The adsorption region is preferably maintained at a temperature from about 0° C. (32° F.) to about 80° C. (176° F.). The capacity of an adsorbent bed is limited by the maximum size which can conveniently be used, either because of the mechanical strength of the individual adsorbent particles or because of the maximum size which can be used for shipping the containers or vessels containing the adsorbents. For these reasons, the operation of 4 to 10 or more adsorbent beds arranged in parallel is standard in the art. In order to optimize PSA processes, the phases of compression and decompression of the various adsorbent beds are synchronized. It is particularly advantageous to introduce stages of pressure equalization between two adsorbent beds, one of these beds being in the decompression phase and the other in the recompression phase.

DETAILED DESCRIPTION OF THE DRAWINGS

In FIG. 1, only the pipes through which hydrogen circulates, at a given moment, have been represented. More specifically, at the moment under consideration, adsorbent beds 1 to 3 are in the production phase, adsorbent beds 4 to 6 are in the decompression phase, adsorbent beds 7 and 8 are in the regeneration phase, and adsorbent beds 9 and 10 are in the recompression phase.

Adsorbent beds 1 to 3 are fed with the gas mixture to be purified via pipes 11, 12 and 13 respectively. Pipes 11, 12 and 13 are each connected to a source of gas mixture 14 via pipe 15. The purified hydrogen is recovered at the outlet of adsorbent beds 1 to 3 via pipes 16, 17 and 18.

All three of the pipes 16 to 18 run into pipe 19 which conveys the purified hydrogen, coming from pipes 16, 17 and 18, to storage chamber 21 via pipe 19. A portion of the hydrogen produced is withdrawn from pipe 19 via pipes 23 and 22 and conveyed to adsorbent bed 10, which is then at the end of the recompression phase. During this same period, adsorbent bed 4 is starting the decompression phase by pressure equalization with adsorbent bed 10 via pipes 24 and 22. Adsorbent bed 4 is at higher pressure than adsorbent bed 10 at this point in the cycle so adsorbent bed 4 will depressurize while the pressure is increased in adsorbent bed 10. After the pressure equalization step, adsorbent bed 10 continues to receive product H2 gas from pipe 19 via lines 23 and 22 until its pressure equalizes with adsorbent beds 1, 2, and 3 to complete the recompression step.

During this same period, pressure equalization of adsorbent beds 5 and 9 is carried out. To do this, the respective outlets of adsorbent beds 5 and 9 are in communication via line 25. Adsorbent bed 5, which is in the decompression phase, is then under a relatively high hydrogen pressure, whereas adsorbent bed 9, which is at the beginning of the recompression phase, is at a much lower pressure. As a result of the pressure difference existing between adsorbent beds 5 and 9, hydrogen is driven from adsorbent bed 5 to adsorbent bed 9, which contributes to the recompression of adsorbent bed 9 and to the concomitant decompression of adsorbent bed 5.

In the same way, adsorbent beds 6 and 8 are placed in communication with one another via pipe 26. Adsorbent bed 6 is in its final phase of cocurrent depressurization and provides hydrogen purge gas needed for adsorbent bed 8. Here again, insofar as the pressure prevailing within adsorbent bed 6 is greater than the pressure prevailing within adsorbent bed 8, the hydrogen flows from adsorbent bed 6 to adsorbent bed 8. Adsorbent bed 8 is at the lowest pressure and being purged by the hydrogen gas produced by decompression of adsorbent bed 6. The desorbed impurities and hydrogen flow out as tail gas from pipe 28.

Adsorbent bed 7 is in the countercurrent decompression phase. Its pressure is lowered simply by discharging the hydrogen and impurities via pipe 27 from adsorbent bed 7. It is at this decompression stage that the desorption of the impurities adsorbed on the adsorbent bed takes place.

The data presented in FIG. 2 were obtained in the following manner. A zeolite X powder was produced by the traditional method of the batch crystallization of the admixed starting materials. A sample of the resulting zeolite X powder (identified as Sample A) was analyzed for particle size distribution and was found to have a mean particle diameter of 3.5 microns based on mass frequency. The results from the particle size distribution analysis are presented in FIG. 2 and resulting calculations showed that the standard deviation and the coefficient of variation were 1.49 and 42.9%, respectively. The standard deviation was calculated in accordance with the principles of statistical analysis. The coefficient of variation was calculated by dividing the standard deviation by the mean diameter and multiplying the quotient by 100 and the result is expressed as a percentage. Although the mean particle diameter of Sample A was 3.5 microns, it could be expected that the range of mean particle diameters could range from 3 to 12 microns depending on the conditions maintained during the batch crystallization.

Figure 2:
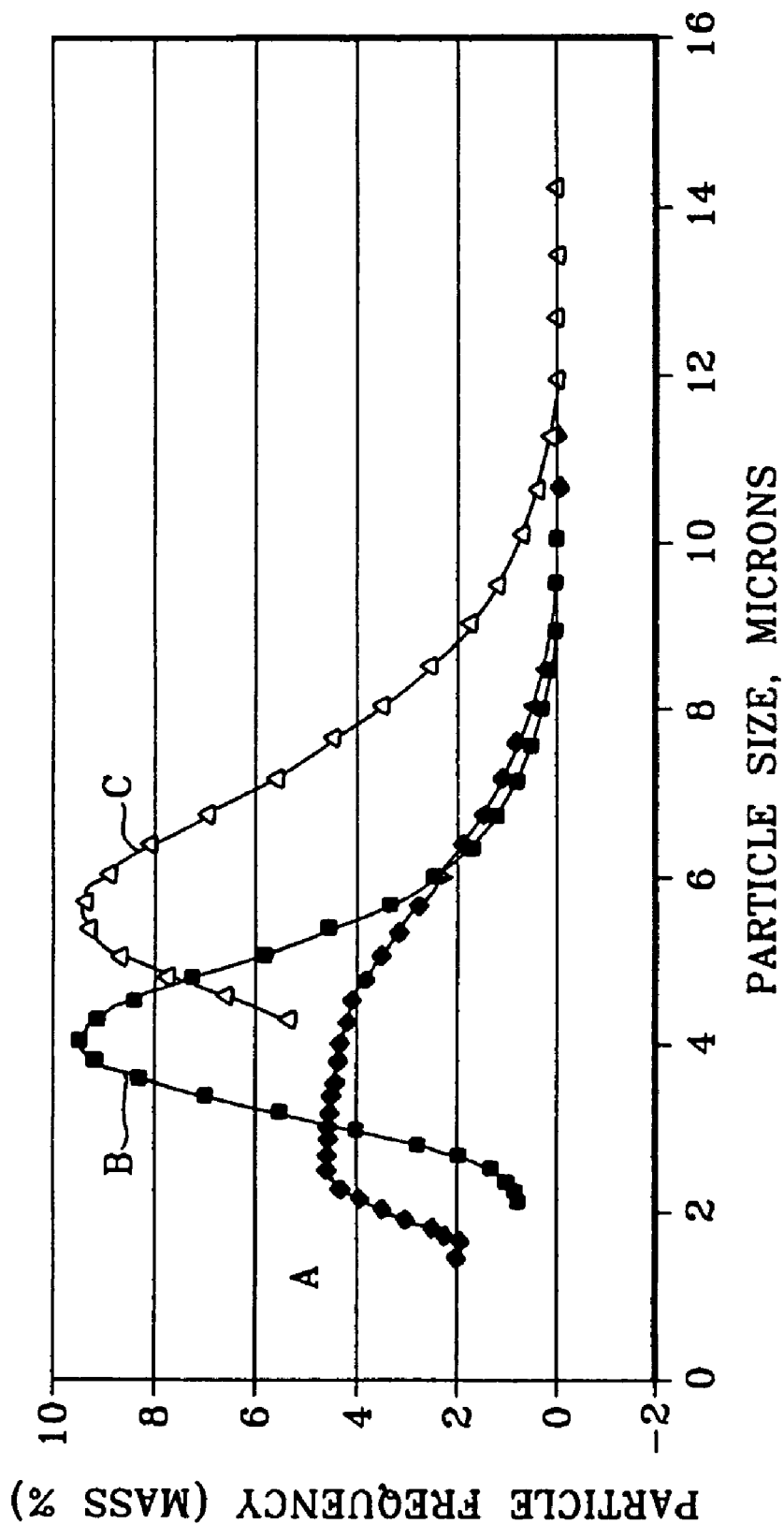
FIG. 2 is a graph of particle size distribution of a prior art zeolite X and two examples of zeolite X in accordance with the present invention.

From FIG. 2, it can be seen that a majority of the particles in Sample A are widely scattered with respect to particle diameter. This observation is reflected by the calculations wherein the standard deviation is 1.49 and the coefficient of variation is 42.9%.

A zeolite X powder was produced by the continuous addition of nutrients in accordance with the methods and techniques more fully described in U.S. Pat. No. 6,773,694 B1. A sample of this zeolite X powder (identified as Sample B) was analyzed for particle size distribution and was found to have a mean particle diameter of 4.1 microns based on mass frequency. The results from the particle size distribution analysis are presented in FIG. 2 and resulting calculations showed that the standard deviation and coefficient of variation were 1.04 and 25.2%, respectively.

From FIG. 2, it can be seen that the particles in Sample B are less widely scattered with respect to particle diameter compared with Sample A. This observation is reflected and supported by the calculations wherein the standard deviation is 1.04 and the coefficient of variation is 25.2%.

Another zeolite X powder was produced by the continuous addition of nutrients in accordance with the method described in U.S. Pat. No. 6,773,694 B1. A sample of this zeolite X powder (identified as Sample C) was analyzed for particle size distribution and was found to have a mean particle diameter of 6.0 microns based on mass frequency. The results from the particle size distribution analysis are presented in FIG. 2 and the resulting calculations showed that the standard deviation and coefficient of variation were 1.34 and 22.3%, respectively. From FIG. 2 it can be seen that particles in Sample C are also less widely scattered with respect to particle diameter compared with Sample A. This observation is reflected by the calculation wherein the standard deviation is 1.34 and the coefficient of variation is 22.3%.

EXAMPLE

The data presented in FIG. 3 were obtained in the following manner. A pressure swing adsorption (PSA) pilot plant was selected and used to simulate a large commercial hydrogen purification system utilizing multiple adsorber beds. The pilot plant consisted of a single adsorber and multiple equalization tanks which were used to store gas from the different cycle steps. The cylindrical adsorbent bed had a diameter of 38 mm (1.5 inches) and a height of 3048 mm (120 inches).

Adsorbent particulate was prepared from prior art zeolite X powder (Sample A) having the particle distribution presented in FIG. 2 and was loaded into the adsorbent bed of the pilot plant. The bottom 65% of the bed was loaded with activated carbon and the top 35% was loaded with the prior art zeolite X (Sample A) particulate having a nominal diameter of about 1.45 mm. The adsorbent bed was operated in an upflow manner during the adsorption step and was maintained at a temperature of 38° C. (100° F.). The test feed gas contained 75 volume percent hydrogen, 0.7 volume percent nitrogen, 2 volume percent carbon monoxide, 5 volume percent methane and 17.3 volume percent carbon dioxide. The feed pressure was maintained at 2206 kPa (320 psia), the final cocurrent depressurization pressure was 276 kPa (40 psia) and the purge or regeneration pressure was 159 kPa (23 psia). Tests were made at three different cycle times, i.e., 3.5, 7 and 14 minutes. Total time for each cycle has four major steps (adsorption, cocurrent depressurization, regeneration and pressurization). The time distribution, expressed as percent of total cycle time, for the four major steps was kept constant at all three cycle times. The feed rate was controlled to achieve 10 ppm carbon monoxide in the product hydrogen. The flow and composition were measured for the feed, product and tail gas streams, and then the hydrogen recovery was calculated for each test. The resulting data are presented in FIG. 3.

Adsorbent particulate was prepared from zeolite X powder of the present invention (Sample C) having the particle distribution presented in FIG. 2 and was tested in the pilot plant in exactly the same manner as described hereinabove. The particulate adsorbent had a nominal particle diameter of about 1.45 mm. The resulting data are also presented in FIG. 3. Sample C (invention), as noted above, had a mean particle diameter of 6.0 microns. In contrast, Sample A (prior art) had a mean particle diameter of 3.5 microns. Generally a smaller particle size would be more efficient because the diffusion distance is smaller. Despite the larger particle diameter of Sample C, the desorbent prepared from Sample C demonstrated unexpected efficiency.

Figure 3:
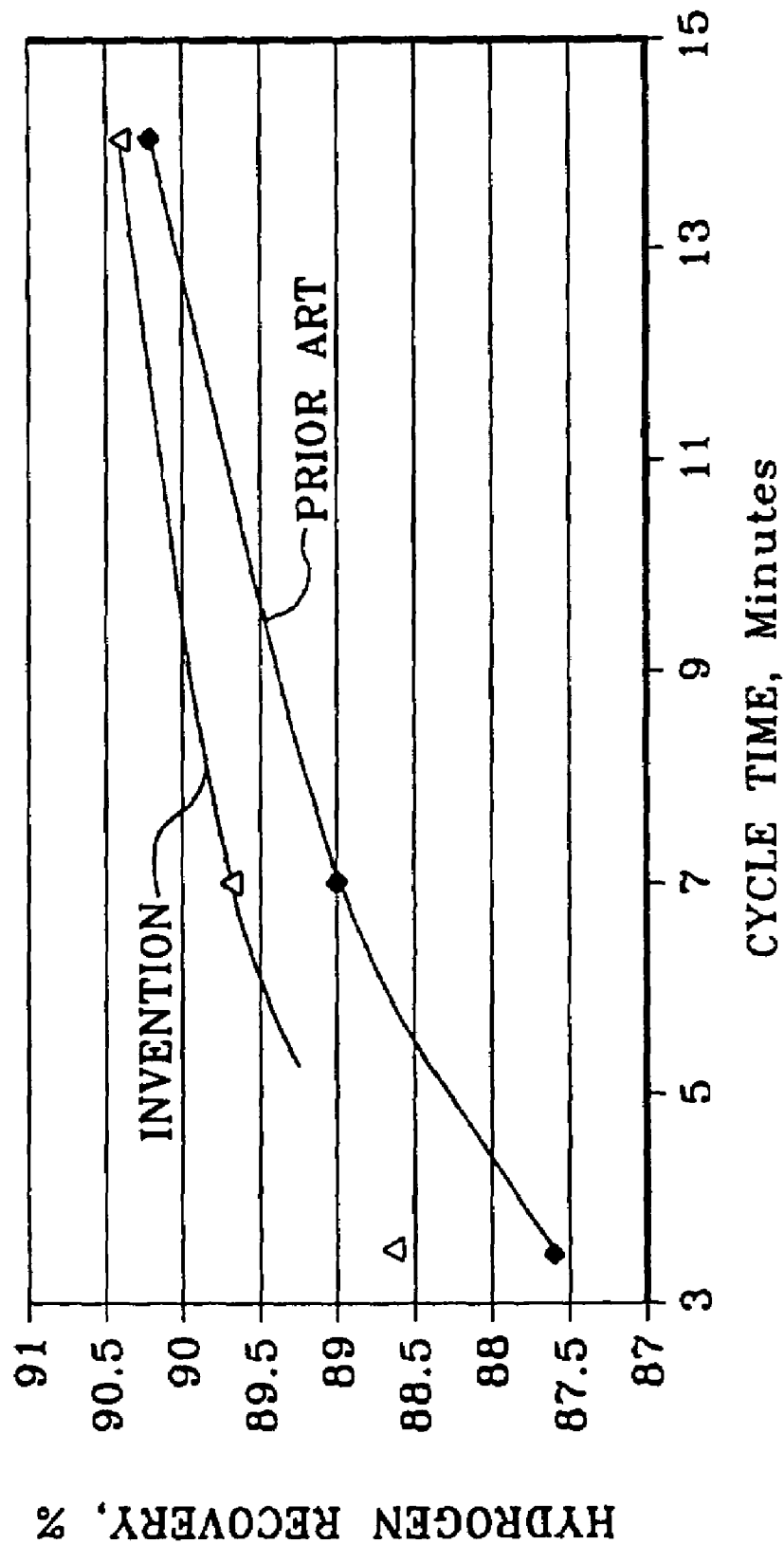
FIG. 3 demonstrates the unexpectedly improved hydrogen recovery in a PSA system utilizing adsorbent made from zeolite X having a particle size distribution with a coefficient of variation from about 15% to about 30% compared with prior art zeolite X having a different particle size distribution.

From FIG. 3 it can be seen that at a cycle time of 14 minutes, the hydrogen recovery was 0.1% greater while utilizing the present invention compared with the prior art. At a cycle time of 7 minutes, the hydrogen recovery was 0.7% greater while using the present invention. At a cycle time of 3.5 minutes, the hydrogen recovery was 1.0% greater with the present invention. In accordance with the present invention, the improved hydrogen recovery enables the use of shorter cycle times thereby lowering the size and capital expense of a PSA unit for the same production capacity. Since a higher percentage of the hydrogen feedstream is recovered, a smaller hydrogen plant is therefore required to produce a selected hydrogen production rate.

Although not wishing to be bound by any theory, it is believed that the relative uniformity of the particle diameter of zeolite X powder with a coefficient of variation from about 15% to about 30% enables the formation of adsorbent particulate produced therefrom to achieve unexpected and superior adsorbent characteristics as demonstrated herein.

The foregoing description, drawings and example clearly illustrate the advantages encompassed by the process of the present invention and the benefits to be afforded with the use thereof.

What is claimed is:

1. A process for the separation and purification of hydrogen contained in a gas mixture contaminated by impurities which comprises contacting the gas mixture to be purified in an adsorption region containing an adsorbent comprising a zeolite X powder wherein the particle size distribution of the zeolite X powder has a coefficient of variation from about 15% to about 30%.

2. The process of claim 1 wherein the gas mixture to be purified contains more than about 50 percent of gaseous hydrogen.

3. The process of claim 1 wherein the adsorption region is maintained under a pressure from about 790 kPa (100 psig) to about 7000 kPa (1000 psig).

4. The process of claim 1 wherein the silica/alumina ratio of the zeolite X powder is between 2.0 and 2.5.

5. The process of claim 1 wherein the mean diameter of the zeolite X particles range from about 4 to about 12 microns.

6. The process of claim 1 wherein the mean diameter of the zeolite X particles range from 6 to 10 microns.

7. The process of claim 1 wherein a pressure swing adsorbent system is utilized.

8. A process for the separation and purification of hydrogen contained in a gas mixture contaminated by impurities which comprises contacting the gas mixture to be purified in an adsorption region containing an adsorbent comprising a zeolite X powder synthesized by providing a slurry of seed crystals at reaction conditions; adding to the slurry nutrients, to provide framework elements of the seed crystals thereby growing the seed crystals; performing the addition at a rate that essentially equals the crystal growth rate and for a time sufficient to produce the zeolite X powder.

9. The process of claim 8 wherein the gas mixture to be purified contains more than about 50 percent of gaseous hydrogen.

10. The process of claim 8 wherein the adsorption region is maintained under a pressure from about 790 kPa (100 psig) to about 7000 kPa (1000 psig).

11. The process of claim 8 wherein the silica/alumina ratio of the zeolite X powder is between 2.0 and 2.5.

12. The process of claim 8 wherein the mean diameter of the zeolite X powder particles range from about 4 to about 12 microns.

13. The process of claim 8 wherein the mean diameter of the zeolite X powder particles range from 6 to 10 microns.

14. The process of claim 8 wherein a pressure swing adsorbent system is utilized.

15. The process of claim 8 wherein the zeolite X powder has a particle size distribution has a coefficient of variation from about 15% to about 30%.

16. A process for the separation and purification of hydrogen contained in a gas mixture contaminated by impurities which comprises contacting the gas mixture to be purified in a pressure swing adsorbent system containing an adsorbent comprising a zeolite X powder wherein the particle size distribution of the zeolite X powder has a coefficient of variation from about 15% to about 30% and the mean diameter of the zeolite X powder particles range from about 6 to about 12 microns, and wherein the cycle time is less than about 4 minutes to achieve a hydrogen recovery of at least about 88 volume percent.

17. The process of claim 16 wherein the adsorbent has a bulk crush strength of greater than about 960 kPa (125 psig).

18. The process of claim 16 wherein the gas mixture to be purified contains more than about 50 percent of gaseous hydrogen.

19. The process of claim 16 wherein the silica/alumina ratio of the zeolite X powder is between 2.0 and 2.5.

20. A process for the separation and purification of hydrogen contained in a gas mixture contaminated by impurities which comprises:

(a) passing a hydrogen based gas mixture contaminated by at least carbon monoxide and containing at least one other impurity selected from the group consisting of carbon dioxide, nitrogen and $C_1$-$C_8$ hydrocarbons into an adsorption region comprising at least one first adsorbent bed containing a first adsorbent selective for at least carbon dioxide and $C_1$-$C_8$ hydrocarbons, and one second adsorbent bed composed of a second adsorbent bed composed of a second adsorbent comprising a zeolite X powder wherein the particle size distribution of the zeolite X powder has a coefficient of variation from about 15% to about 30%;

(b) desorbing the carbon monoxide and the other impurity or impurities adsorbed on the at least first and second adsorbents by inducing a pressure gradient and progressively lowering the pressure in the adsorption region, so as to desorb the carbon monoxide and the other impurity or impurities via an inlet to the adsorption region; and (c) raising the pressure in the adsorption region.

21. The process of claim 20 wherein the gas mixture to be purified contains more than about 50 percent of gaseous hydrogen.

22. The process of claim 20 wherein the adsorption region is maintained under a pressure from about 790 kPa (100 psig) to about 7000 kPa (1000 psig).

23. The process of claim 20 wherein the silica/alumina ratio of the zeolite X powder is between 2.0 and 2.5.

24. The process of claim 20 wherein the mean diameter of the zeolite X powder particles range from about 4 to about 12 microns.

\* \* \* \* \*